May 5, 1936.　　　D. SILVERMAN　　　2,039,851
ELECTRIC POWER SYSTEM
Filed Feb. 23, 1934　　　2 Sheets-Sheet 1

WITNESSES:
O.A. McCloskey
R.R. Lockwood

INVENTOR
Daniel Silverman
By G.M. Crawford
ATTORNEY

May 5, 1936.    D. SILVERMAN    2,039,851
ELECTRIC POWER SYSTEM
Filed Feb. 23, 1934    2 Sheets-Sheet 2
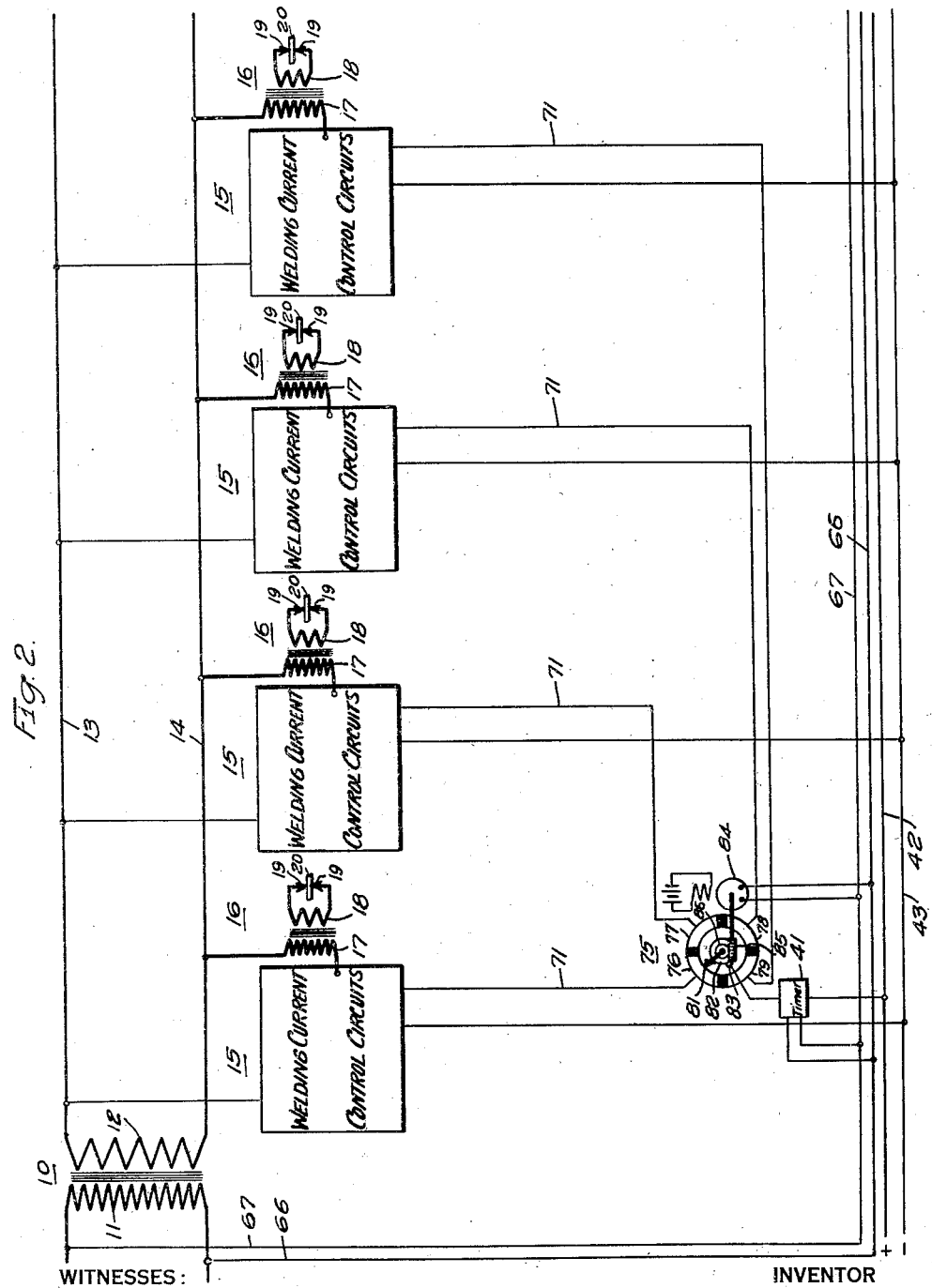
WITNESSES:
E. A. McCloskey.
R. R. Lockwood
INVENTOR
Daniel Silverman.
BY
ATTORNEY Patented May 5, 1936

2,039,851

UNITED STATES PATENT OFFICE 2,039,851

ELECTRIC POWER SYSTEM

Daniel Silverman, Wilkinsburg, Pa., assignor to Westinghouse Electric & Manufacturing Company, East Pittsburgh, Pa., a corporation of Pennsylvania Application February 23, 1934, Serial No. 712,532

15 Claims. (Cl. 171—97)

My invention relates, generally, to electric welding and it has particular relation to resistance welding.

In the spot welding process, current is caused to flow through the work for only a very short period of time for the purpose of performing the welding operation and to prevent the work adjacent the weld area from being affected due to the heat resulting from the welding operation. Ordinarily, alternating current is used for performing the welding operation and it is permitted to flow for only a very limited number of cycles. When alternating current having a frequency of 60 cycles is used, it is often the practice to permit the current to flow for from one to five cycles to form each spot weld. Therefore, it will be obvious that the period during which current is not applied to perform the spot welding operation is considerably longer than the period during which current is applied, since a relatively longer period of time is required to move the work to the position where the next spot weld is to be made.

By means of electronic control apparatus which has recently become available, it is possible to effect the flow of current during such short periods of time with an accuracy which has been heretofore impossible. Furthermore, by means of this new apparatus exactly the same number of cycles are permitted to flow for successive welding operations with a constancy which could not be achieved by any other apparatus that had previously been known to those skilled in the art.

When a battery of spot welders is used in a shop or factory which employs spot welding apparatus on a large scale production basis, it is desirable to so arrange the times when each of the spot welders of the battery will be connected to the power source in such manner that the instantaneous current flow from the power source at any one time will be reduced to a minimum. If the control for the current flow to the spot welders is so arranged that it is possible that all of them may be connected at the same instant to the power source, it will be necessary to provide a supply circuit and transformer therefor having a kva. capacity equivalent to the total kva. capacity of all of the spot welders.

In view of the fact that the spot welding operation is only effected during a comparatively short period, it will be obvious that it is desirable to control the connections of the individual spot welders to the power source in such manner that no two of them will be connected to the power source at the same time.

Assuming that the control apparatus is arranged to supply current to each spot welder for a period of two cycles from a 60-cycle source, then it will be obvious that twenty spot welders could be connected to a power source having a kva. capacity equivalent only to that of a single welder provided that some means is employed for sequentially connecting each of the spot welders so that no two of them will be connected to the power source at the same time. With the proposed arrangement, a margin of one cycle is provided between the times of operation of each welder. It will be understood that this arrangement is merely illustrative and that other combinations of apparatus and times of application of welding current may be employed.

While I am aware that various devices are well known to those skilled in the art for sequentially connecting individual spot welders of a battery of spot welders to the main power supply, I have found that none of the prior art devices can effect the accuracy and simplicity of control which may be accomplished by the herein described invention. All of the prior art devices, insofar as I am aware, have attempted directly to control the current flow to each of the individual welders. It will be obvious that this is a comparatively inaccurate arrangement for the reason that it is extremely difficult to accurately control directly the flow of large quantities of energy.

The object of my invention, generally stated, is to provide control apparatus for a battery of spot welders which shall be simple and efficient in operation, and which may be readily and economically manufactured and installed.

The principal object of my invention is to provide for sequentially connecting the individual spot welders of a battery of spot welders to a power source without connecting more than one welder to the power source at any time.

Another important object of my invention is to provide for effecting the sequential operation of vapor electric devices, individual to each spot welder in a battery of spot welders, in order to connect the welders to a power source in a corresponding sequence.

Another object of my invention is to provide for controlling by means of a single timing device, the current flow to each of the spot welders in a battery of spot welders to permit current to flow to only a single spot welder at any time.

Other objects of my invention will, in part, be obvious and, in part, appear hereinafter.

My invention accordingly is disclosed in the embodiment hereof shown in the accompanying drawings and comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawings, in which:

Fig. 2 illustrates diagrammatically a second embodiment of my invention.

Figure 1:
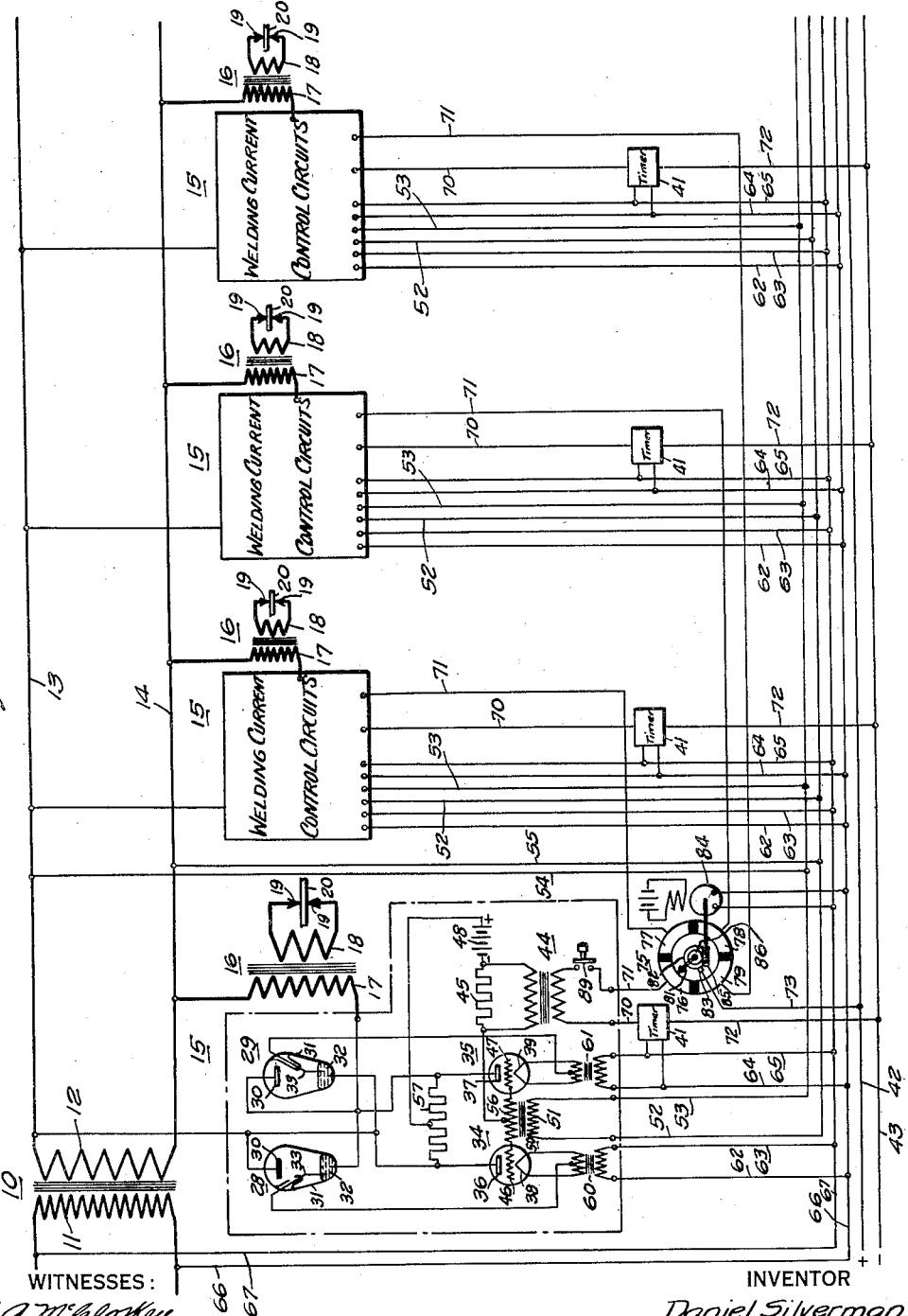
Figure 1 illustrates diagrammatically one embodiment of my invention.

Referring now particularly to Fig. 1 of the drawings, the reference character 10 designates, generally, a main transformer having a primary winding 11 which may be connected to any suitable source of alternating current such as a 60-cycle source, and a secondary winding 12 which may be connected to a main power bus comprising conductors 13 and 14. A battery of welders, only four of which are shown, each generally at 15, is provided and connected to the conductors 13 and 14 as illustrated. It will be understood that a larger number of individual welders 15 may be connected to the conductors 13 and 14 as the conditions may warrant.

It will be observed that the welder 15 shown at the left-hand side of Fig. 1 of the drawings, has been shown in detail insofar as the circuit connections are concerned. In order to avoid duplication and complication of the drawings, the additional welders 15 are schematically illustrated. It will be understood, however, that the same circuit connections may be used for the additional welders if desired.

The welder 15 comprises a welding transformer, shown generally at 16, having a primary winding 17 for connection to the conductors 13 and 14 and a secondary winding 18 for connection to welding electrodes 19 between which work 20 may be positioned.

In order to control the application of welding current to the welding transformer 16, vapor-electric devices, shown generally at 28 and 29, are provided. The devices 28 and 29 are of the mercury vapor type in each of which an anode 30 is provided, as illustrated, in a suitable container 31 at the bottom of which is located a pool of mercury 32, forming the cathode. The container 31 is evacuated and is then filled with mercury vapor.

In order to render the vapor-electric devices 28 and 29 conducting a starting electrode or crystal 33 is provided in each of them which comprises a material such as boron, carborundum or the like. It has been found that, when a certain amount of current is caused to flow through the starting electrodes 33 into the mercury pools 32, cathode spots are formed which cause the mercury vapor within the containers 31 to become conducting, provided the proper polarities are applied to the anodes 30 and the mercury pools or cathodes 32. Thus, it is only necessary to pass sufficient starting current through the starting electrodes 33 to form the cathode spots at a predetermined time in the proper half-cycle in the alternating current wave to render the vapor-electric devices 28 and 29 conducting for the remainder of their particular half cycles, it being a characteristic of these devices to remain in the conducting state for the remainder of a half-cycle after they have once been rendered conducting.

In order to conduct succeeding half cycles of alternating current, the vapor-electric devices 28 and 29 are connected inversely, that is, the anode 30 and cathode 32 of the devices 28 and 29 respectively, are connected together, while the cathode 32 and the anode 30 thereof are also connected together, as illustrated in the drawings.

The two vapor-electric devices 28 and 29 connected in this manner, are then interposed between one of the terminals of the primary winding 17 of transformer 16 and the power conductor 13, the other terminal of the primary winding 17 being connected as shown in the diagram directly to the power conductor 14. It will, therefore, be evident that if the vapor-electric devices 28 and 29 are rendered conducting by energizing the starting electrodes 33, current will continue to flow therethrough as long as this condition is maintained. However, if the starting electrodes 33 are not energized during a time interval corresponding to a time longer than the half cycle during which either of the vapor-electric devices 28 or 29 is adapted to be conducting, neither of them will conduct a succeeding half cycle. It is necessary to ignite the vapor in the devices 28 and 29 for each half cycle for which each of them is adapted to be conducting, and if they are not so ignited, then current will not be conducted for periods longer than one-half cycle.

With a view to rendering the vapor-electric devices 28 and 29 conducting, control tubes 34 and 35, of the hot cathode type, may be provided and their anodes 36 and 37 may be connected to the anodes of the vapor electric devices 28 and 29, respectively, as shown. The cathodes 38 and 39 of the control tubes 34 and 35 are connected in the customary manner to the starting electrodes 33 of the vapor-electric devices 28 and 29, respectively. The control tubes 34 and 35 are arranged to pass sufficient current through the starting electrodes 33 so that the cathode spots will be formed, as set forth hereinbefore, to render the vapor-electric devices 28 and 29 conducting.

In order to initiate the functioning of the control tubes 34 and 35, a timer, shown generally at 41, is provided which is arranged to apply an impulse obtained from a direct current source which may be represented by the conductors 42 and 43 through an insulating or impulse transformer 44, to a resistor 45. The control impulse thus obtained is of such polarity as to overcome the negative potential which is normally applied to the grids 46 and 47 of the control tubes 34 and 35 by means of a direct current source such as a battery 48. The timer 41 may be of any suitable type which will apply the control impulse to the grids 46 and 47 at the proper instant in the half cycles during which it is desired that the vapor electric devices 28 and 29 be conducting. A timer suitable for this purpose, is described in the copending application of Edwin H. Vedder, Serial No. 710,095, filed February 7, 1934, and assigned to the assignee of this application. It will be understood, however, that other types of control apparatus may be provided for controlling the functioning of the space discharge devices 28 and 29 and further, that other types of space discharge devices may be employed as well.

For the purpose of controlling both of the grids 46 and 47 of the control tubes 34 and 35, a transformer 50 may be provided having a primary winding 51 connected by means of conductors 52, 53, 54 and 55 to the power conductors 13 and 14, as illustrated. The transformer 50 is also provided with a secondary winding 56 which may be connected to the grids 46 and 47. A resistor 57 is connected between the anodes 36 and 37 of the control tubes 34 and 35. By means of the transformer 50 and the resistor 57, the potentials of the cathodes 38 and 39 of the control tubes 34 and 35 are reduced to a common point with respect to the control potentials which are applied thereto by means of the battery 48, or as obtained through the impulse transformer 44. It will be observed that the control potentials, as obtained from the battery 48, and the impulse transformer 44, are applied to the midpoints of the secondary winding 56 and the resistor 57. It is, therefore, unnecessary to provide a control circuit individual to each of the control tubes 34 and 35, although the anodes and cathodes of these tubes are oppositely connected.

It will be observed that the cathodes 38 and 39 may be heated by means of filament transformers 60 and 61 which are connected, respectively, by means of conductors 62 and 63, 64 and 65 to conductors 66 and 67, which may be connected to the same source as the primary winding 11 of the main power transformer 10. It will also be observed that the timer 41 is connected to the conductors 64 and 65 so that its operation may be synchronized, as set forth in the copending application hereinbefore referred to, with the alternating current power supply. Conductors 70 and 71, together with conductors 72 and 73 serve to connect the primary winding of the impulse transformer 44 to the direct current source represented by the conductors 42 and 43. The timer 41 is interposed between the conductors 70 and 72, while a distributor, shown generally at 75, is interposed between the conductors 71 and 73.

The distributor 75 is provided in order to permit the connection of only one of the welders 15 to the power conductors 13 and 14 at any one time. The distributor may comprise a plurality of insulated segments 76, 77, 78 and 79, each of which is individual to one of the welders 15. As illustrated, the segment 76 is connected to the conductor 71 while the remaining segments may be connected in a corresponding manner to the other welders. A rotatably mounted conducting arm 81 is provided for sequentially engaging each of the segments 76, 77, 78 and 79, and it is arranged to be connected by means of a slip ring 82 and a brush 83 to the conductor 73. The arm 81 may be rotated by means of a motor 84 which, in this instance, is illustrated as a synchronous motor. As shown, the motor 84 is disposed to drive a worm 85 which engages a second worm 86 that is arranged to rotate the arm 81.

The motor 84 may be connected to the conductors 66 and 67 so that the functioning of the distributor 75 may be synchronized with the frequency of the alternating current supply. It will be understood, however, that it is not essential that a synchronous motor be used, but it is desirable to provide a motor which will operate the distributor 75 at a substantially constant speed.

A push button switch 89 is provided in the circuit to the primary winding on the impulse transformer 44, so that the operator may control the application of current to effect the spot welding operation in accordance with the particular conditions existing at the welder.

In operation, the work 20 having been positioned between electrodes 19 and the proper pressure being applied, the operator depresses the push button switch 89. As soon as the arm 81 of the distributor 75, rotated by the motor 84, comes into engagement with the segment 76, the circuit will be completed to place the timer 41 in control of the functioning of the welder 15. At the instant for which the timer 41 is adjusted, when the proper control impulse is applied to the grids 46 and 47 of the control tubes 34 and 35, the corresponding vapor electric devices 28 and 29 will be rendered conducting and the number of half cycles of alternating current will be permitted to flow to perform the welding operation for which the timer 41 is adjusted. Ordinarily, the length of segment 76 will be such that the timer 41 will have had sufficient time to apply the welding current for the particular welding operation for which it is set. Stated differently, the arm 81 is arranged to remain in engagement with segment 76 for a time sufficiently long to permit the welding operation to be effected.

Succeeding operations at different spot welders 15 may be performed in the manner described hereinbefore. It will be observed that the maximum time which any particular operator must wait until current will be applied to his welder is approximately the time required for the arm 81 to make one complete revolution. In view of the fact that, in practice, the speed of rotation of the arm 81 may be relatively high, this time will ordinarily be inappreciable, and as far as the operator is concerned, the welding operation will be performed substantially as soon as the push button 89 is depressed. However, in no instance will it be possible for more than one of the welders 15 to be connected to the power conductors 13 and 14 at any one time.

In the event that it is possible to operate all of the welders 15 under substantially the same conditions, so that the same number of half cycles will be applied to each for performing the spot welding operation, the timers 41 individual to each of the welders 15 may be eliminated and a single timer 41 may be employed as illustrated in Fig. 2 of the drawings. It will be understood that the circuits shown in Fig. 2 of the drawings are substantially identical with those shown in Fig. 1, the only difference being that a single timer 41 is used and corresponding alterations have been made in the circuits as shown. In order to avoid complication, the remaining circuit connections, which are identical with those shown in Fig. 1 of the drawings, have been omitted.

The construction of the distributor 75 may be the same as that described hereinbefore, the timer 41, however, being connected between the brush 83 and the positive conductor 42. It will thus be possible to use a single timer 41 which will be effective to render the space discharge devices 28 and 29 conducting for the same number of half cycles for each of the welders 15.

While this invention has been described in connection with spot welding apparatus, it will be understood that this particular type of apparatus has been used for illustrative purposes only. The embodiment of this invention may be used in conjunction with other types of welding apparatus such as line or seam welding or flash welding or for any other apparatus requiring a duty cycle similar to that described herein.

Since certain further changes may be made in the above construction, and different embodiments of the invention may be made without departing from the scope thereof, it is intended that all matter contained in the above description or shown in the accompanying drawings, shall be interpreted as illustrative and not in a limiting sense.

I claim as my invention:

1. An electric system comprising, in combination, a source of alternating current, a plurality of load devices, vapor-electric means disposed to control the flow of current to said load devices, control means connected to render said vapor-electric means conducting during a predetermined period of time, and distributor means common to all of said load devices for sequentially effecting the energization of said control means individual to each load device.

2. An electric system comprising, in combination, a source of alternating current, a plurality of load devices, circuit means connecting said load devices to said source, vapor-electric means interposed in said circuit means for controlling the flow of current therethrough, control means connected to render said vapor-electric means conducting during a predetermined period of time, and distributor means common to all of said load devices for sequentially effecting the energization of said control means individual to each load device, said distributor means being disposed to effect the connection of only one load device to said source of alternating current at any time.

3. An electric system comprising, in combination, a source of alternating current, a plurality of load devices, circuit means connecting said load devices to said source, vapor-electric means interposed in said circuit means for controlling the flow of current therethrough, space-discharge means connected to render said vapor-electric means conducting, timer means disposed to effect the functioning of said space discharge means to render said vapor-electric means conducting during a predetermined number of half cycles of the alternating current, and distributor means common to all of said load devices for sequentially effecting the operation of said timer means individual to each load device.

4. An electric system comprising, in combination, a source of alternating current, a plurality of load devices, circuit means connecting said load devices to said source, vapor-electric means interposed in said circuit means for controlling the flow of current therethrough, space discharge means connected to render said vapor-electric means conducting, timer means disposed to effect the functioning of said space discharge means to render said vapor-electric means conducting during a predetermined number of half cycles of the alternating current, and distributor means common to all of said load devices for sequentially effecting the operation of said timer means individual to each load device, said distributor means being disposed to effect the connection of only one load device to said source of alternating current at any time.

5. An electric system comprising, in combination, a source of alternating current, a plurality of load devices, circuit means connecting said load devices to said source, vapor-electric means interposed in said circuit means for controlling the flow of current therethrough, space-discharge means connected to render said vapor-electric means conducting, timer means disposed to effect the functioning of said space discharge means to render said vapor-electric means conducting during a predetermined number of half cycles of the alternating current, a source of direct current, circuit means connecting said timer means to said source of direct current, a distributor interposed in said last-named circuit means and common to all said load devices comprising a switch having a segment individual to each of said timer means, and driving means disposed to operate said switch to sequentially effect the functioning of said timer means.

6. An electric system comprising, in combination, a source of alternating current, a plurality of load devices, circuit means connecting said load devices to said source, vapor-electric means interposed in said circuit means for controlling the flow of current therethrough, space-discharge means connected to render said vapor electric means conducting, timer means disposed to effect the functioning of said space-discharge means to render said vapor-electric means conducting during a predetermined number of half cycles of the alternating current, a source of direct current, circuit means connecting said timer means to said source of direct current, a distributor interposed in said last-named circuit means and common to all said load devices comprising a switch having a segment individual to each of said timer means, and driving means disposed to operate said switch to sequentially effect the functioning of said timer means, said switch being disposed to effect the connection of only one load device to said source of alternating current at any time.

7. An electric system comprising, in combination, a source of alternating current, a plurality of load devices, circuit means connecting said load devices to said current source, vapor-electric means interposed in said circuit means for controlling the flow of current therethrough, and distributor means common to all of said load devices for sequentially rendering said vapor-electric means individual to each load device conducting during predetermined time intervals.

8. An electric system comprising, in combination, a source of alternating current, a plurality of load devices, circuit means connecting said load devices to said current source, vapor-electric means interposed in said circuit means for controlling the flow of current therethrough, and distributor means common to all said load devices for sequentially rendering said vapor electric means individual to each load device conducting during predetermined time intervals, said distributor means being disposed to effect the connection of only one load device to said source of alternating current at any time.

9. An electric system comprising, in combination, a source of alternating current, a plurality of load devices, circuit means connecting said load devices to said current source, vapor-electric means interposed in said circuit means for controlling the flow of current therethrough, space-discharge means connected to render said vapor-electric means conducting, timer means disposed to effect the functioning of said space-discharge means to render said vapor-electric means conducting during a predetermined number of half cycles of the alternating current, and distributor means disposed to sequentially connect said timer means to each of said load devices.

10. An electric system comprising, in combination, a source of alternating current, a plurality of load devices, circuit means connecting said load devices to said current source, vapor-electric means interposed in said circuit means for controlling the flow of current therethrough, space-discharge means connected to render said vapor-electric means conducting, timer means disposed to effect the functioning of said space-discharge means to render said vapor-electric means conducting during a predetermined number of half cycles of the alternating current, and distributor means disposed to sequentially connect said timer means to each of said load devices and to effect the connection of only one load device to said source of alternating current at any time.

11. An electric system comprising, in combination, a source of alternating current, a plurality of load devices, circuit means connecting said load devices to said current source, vapor-electric means interposed in said circuit means for controlling the flow of current therethrough, space-discharge means connected to render said vapor-electric means conducting, timer means disposed to effect the fuctioning of said space discharge means to render said vapor electric means conducting during a predetermined number of half cycles of the alternating current, a source of direct current, and circuit means including a distributor for connecting said timer means to said load devices, said distributor comprising a switch having a segment individual to each load device, and driving means disposed to operate said switch to sequentially connect said timer means to said load devices.

12. An electric system comprising, in combination, a source of alternating current, a plurality of load devices, circuit means connecting said load devices to said current source, vapor-electric means interposed in said circuit means for controlling the flow of current therethrough, space-discharge means connected to render said vapor-electric means conducting, timer means disposed to effect the fuctioning of said space discharge means to render said vapor-electric means conducting during a predetermined number of half cycles of the alternating current, a source of direct current, circuit means including a distributor for connecting said timer means to said load devices, said distributor comprising a switch having a segment individual to each load device, and driving means disposed to operate said switch to sequentially connect said timer means to said load devices, said timer means and switch being disposed to effect the connection of only one load device to said source of alternating current at any time.

13. An electric system comprising, in combination, a plurality of load devices, electronic means individual to each load device for controlling the flow of current thereto from a current source, control means individual to each electronic means, and distributor means common to all of said control means for sequentially effecting the functioning thereof.

14. An electric system comprising, in combination, a plurality of load devices, electronic means individual to each load device for controlling the flow of current thereto from a current source, control means disposed to change the state of conduction of said electronic means for predetermined intervals, and distributor means disposed to control the functioning of said control means to permit the flow of current to only a single load device at any one time.

15. An electric system comprising, in combination, a plurality of load devices, electronic means individual to each load device for controlling the flow of current thereto from a current source, timing control means individual to each electronic means and disposed to change the conducting state of said electronic means for predetermined intervals, and distributor means disposed to sequentially effect the functioning of said timing control means.

DANIEL SILVERMAN.